United States Patent
Halbweiss et al.

(10) Patent No.: US 6,435,598 B1
(45) Date of Patent: Aug. 20, 2002

(54) CONVERTIBLE VEHICLE TOP

(75) Inventors: Thomas Halbweiss, Marbach; Harald Bergerhoff; Christian Holst, both of Hamburg, all of (DE)

(73) Assignee: CTS Fahrzeug-Dachsysteme GmbH, Hamburg (DE)

(*) Notice: Subject to any disclaimer, the term of this patent is extended or adjusted under 35 U.S.C. 154(b) by 0 days.

(21) Appl. No.: 09/966,426

(22) Filed: Sep. 28, 2001

(30) Foreign Application Priority Data

Sep. 29, 2000 (DE) .......................... 100 48 043

(51) Int. Cl.$^7$ ................. B60J 7/00; B60J 1/18
(52) U.S. Cl. ............. 296/107.07; 296/146.14; 296/201
(58) Field of Search ............ 296/146.14, 107.07, 296/108, 201

(56) References Cited

U.S. PATENT DOCUMENTS

| | | | |
|---|---|---|---|
| 3,536,354 A | * 10/1970 | Ingram | .............. 296/107.07 |
| 5,029,932 A | * 7/1991 | Parr | .............. 296/108 |
| 5,456,516 A | * 10/1995 | Alexander et al. | ..... 296/146.14 |
| 5,520,432 A | * 5/1996 | Gmeiner et al. | ............ 296/108 |
| 2002/0017801 A1 | * 2/2002 | Salz et al. | ............. 296/107.07 |

FOREIGN PATENT DOCUMENTS

| | | | |
|---|---|---|---|
| DE | 43 27 729 | 3/1994 | |
| DE | 10039853 | * 9/2001 | ............ 296/107.07 |
| GB | 000728718 | * 4/1955 | ............ 296/107.07 |

\* cited by examiner

Primary Examiner—Stephen T. Gordon
Assistant Examiner—Hilary Gutman
(74) Attorney, Agent, or Firm—Klaus J. Bach

(57) ABSTRACT

In a convertible vehicle top which is movable between a closed position in which it covers an interior vehicle space and an open position in which it is contained in a storage compartment, the vehicle includes rear side windows which are pivotally connected to the vehicle top and the edges of the rear side window remote from the vehicle top are held in sealing engagement with the vehicle body when the top is closed but are pivoted inwardly during movement of the top from the closed to the open position.

8 Claims, 3 Drawing Sheets

CONVERTIBLE VEHICLE TOP

BACKGROUND OF THE INVENTION

The invention relates to a convertible vehicle top, which is adjustable between a closed position and an open position and wherein a side window is arranged between the side area of the vehicle body and the vehicle roof, which is connected to the vehicle top by a pivot joint.

Convertible vehicle tops are either in the form of soft tops with a top linkage and a top cover fabric or in the form of a hardtop with two or three rigid sections which are movable relative to one another. They can be adjusted between a closed position in which they cover the interior vehicle space and a storage position in which the vehicle is open. When in its closed position, the vehicle top extends over the side window panels of the vehicle so that, by means of sealing elements which are arranged in the side area of the top and extend in the longitudinal direction of the vehicle, the vehicle top engages the side window edges in a wind- and water-tight manner.

The vehicle body includes a recess for receiving the side windows for which however space is limited especially in the rear part of the vehicle. As a result, the rear side window panels can have only a limited width so that the view is limited. Furthermore, the rear side window panels can be only partially lowered into the vehicle body when the top is removed.

Such a vehicle top is known from the printed publication DE 43 27 729 A1. The top is in the form of a soft top and includes a top linkage and a fabric extending over the linkage. The soft top is movable between a closed position in which the interior space of the vehicle is covered and an open position in which the interior space is opened and the cover fabric is contained in a storage space. The side window panel is connected to the vehicle top by a pivot joint which is mounted to a vehicle body so that the window panel can be pivoted about a transverse axis and moved in a vertical pivot plane between the raised closing position in which the window panel extends above the vehicle body and an open position in which the window panel is received in a holding space in the vehicle body. Another side window panel is firmly connected to the vehicle body, which limits the movement capabilities particularly of the cover linkage.

It is an object of the present invention to provide a convertible vehicle roof which, in its closed position, reliably seals the passenger compartment of the vehicle in a wind- and water-tight manner and wherein the occupants in the vehicle have an unrestricted view out of the vehicle when the vehicle top is in the closed position.

SUMMARY OF THE INVENTION

The invention relates to a convertible vehicle top which is movable between a closed position in which it covers the vehicle interior and an open position in which it is contained in a storage compartment. The vehicle includes rear side windows which are pivotally connected to the top and are spring-biased outwardly so that the edges of the rear side window remote from the vehicle top are held in sealing engagement with the vehicle body when the top is closed but the rear side windows are pivoted inwardly during movement of the top from the closed to the open position in which the vehicle top is disposed in the storage compartment.

At least one side window panel of the vehicle is firmly connected to the vehicle top and, upon opening and closing of the top, is moved together with the top. In the stored position of the top, the side window panel is deposited, together with the vehicle top in the storage space of the vehicle so that the side area of the vehicle is completely open in the area of the respective side window panel. During transition from the storage position to the closed position, the side window panel is moved, together with the vehicle top, to a position in which it closes the vehicle interior and in which the side of the side window panel facing the vehicle body abuts a part of the vehicle body in a sealing but removable manner.

Since, with arrangement according to the invention, the side window panel is supported by the vehicle top and, in the open or, respectively, storage position, the respective side area is automatically opened, no space is needed in the vehicle side wall for receiving the side window panel, and no window drive is needed. As a result, the vehicle body design is simplified and the view particularly in the rear area of the vehicle top is improved.

The side window panel is connected to the vehicle top by a pivot joint and can be pivoted between an outer closing position, which is assumed when the top is closed and an inwardly pivoted position during storage of the top. The pivot joint between the side window panel and the vehicle top provides for a space saving storage arrangement of the vehicle top together with the side window panel.

The pivot movement of the side window panel is kinematically positively controlled during transition from the closing to the storage position and is preferably power-operated. In a preferred embodiment of the operating mechanism, a force or, respectively, spring element is provided in the vehicle top which biases the side window panel toward its outwardly pivoted, that is, its closing, position so that, during the transition of the top from the storage to the closed position, the side window panel is pivoted by force generated by the force or spring element into the outwardly pivoted closing position. During the reverse movement from the closed to the storage position of the roof the side window panel is pivoted against the force of the spring element by a suitable kinematic operating mechanism.

The upper edge of the side window panel is preferably disposed in a sealing element which provides for a wind- and watertight connection between the upper side edge of the vehicle top and the respective window panel edge.

The sealing element may, at the same time, form the pivot joint, which permits the pivot movement of the side window panel relative to the vehicle top. For that purpose, the sealing element is preferably provided with an area of a reduced cross-section, which forms the pivot axis and permits tilting of the side window panel with a relatively small force. The combination of sealing element and pivot joint as a common component provides for a simple design and a space-saving arrangement.

Another sealing element may be provided at the side edge of the window panel adjacent the vehicle body. One purpose of this sealing element is to engage with its bottom edge the vehicle body in a wind- and watertight manner when the top is in the closed position. Furthermore, this lower sealing element at the side window panel may also have a slide guide function in that the side of the lower sealing element facing the vehicle body forms a slide surface which slides along the vehicle body during the transition from the closing to the storage position.

Another sealing element may be provided on the vehicle body which, in the closing position of the top, cooperates with the sealing element provided at the bottom edge of the side window panel.

In this way, greater tolerances can be accommodated and a good sealing effect can be achieved. The sealing element at the lower edge of the side window panel should slide along the sealing element of the vehicle body during the transition between storage and closing position with only little resistance.

An embodiment of the invention will be described below on the basis of the accompanying drawings.

DESCRIPTION OF A PREFERRED EMBODIMENT

Figure 1:
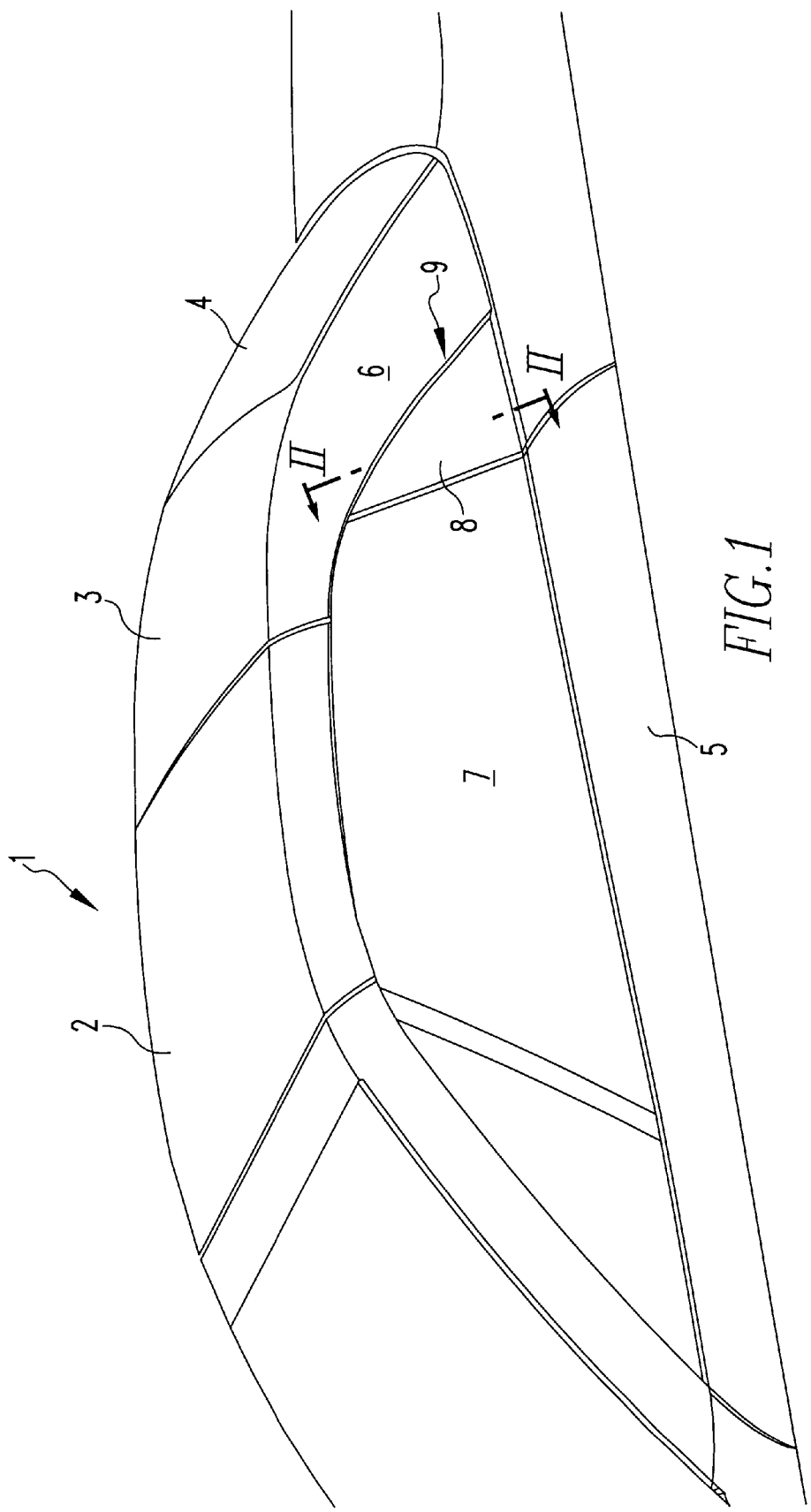
FIG. 1 is a perspective view of a convertible vehicle top with a triangular rear side window panel, which is firmly connected to the vehicle top.

In the figures, identical components are indicated by the same reference numerals.

The convertible vehicle top 1 shown in FIG. 1 is adjustable between a closed position, as shown, wherein it covers the interior space of the vehicle, and a storage position in which the vehicle top 1 is deposited in a storage compartment behind the passenger compartment. The vehicle top is in the form of a hard top and consists of a front top part 2 which, in the closed position, abuts directly the windshield frame of the vehicle and a rear top part 3 into which a rear side window panel 4 is integrated. The front top part 2 is coupled to the rear top part 3 by way of a kinematic linkage, which is connected to the vehicle body 5 by another vehicle-based kinematic mechanism, so that they are movably supported on the vehicle body.

In the rear side area of the vehicle, a triangular side window panel 8 is disposed adjacent a main side window panel 7, which is retractable into the door of the vehicle body 5. In contrast to the main side window panel 7, the triangular side window panel 8 is not supported by the vehicle body but is mounted to the vehicle top. It is connected to the C pillar 6, which forms part of the rear top part 3 and covers the area between the C-pillar 6, the vehicle body and the main side window panel 7 when the vehicle top is in a closed position. The rear side window panel 8 is connected to the C-pillar 6 or, respectively, the rear top part 3 by way of a sealing element 9.

Figure 2:
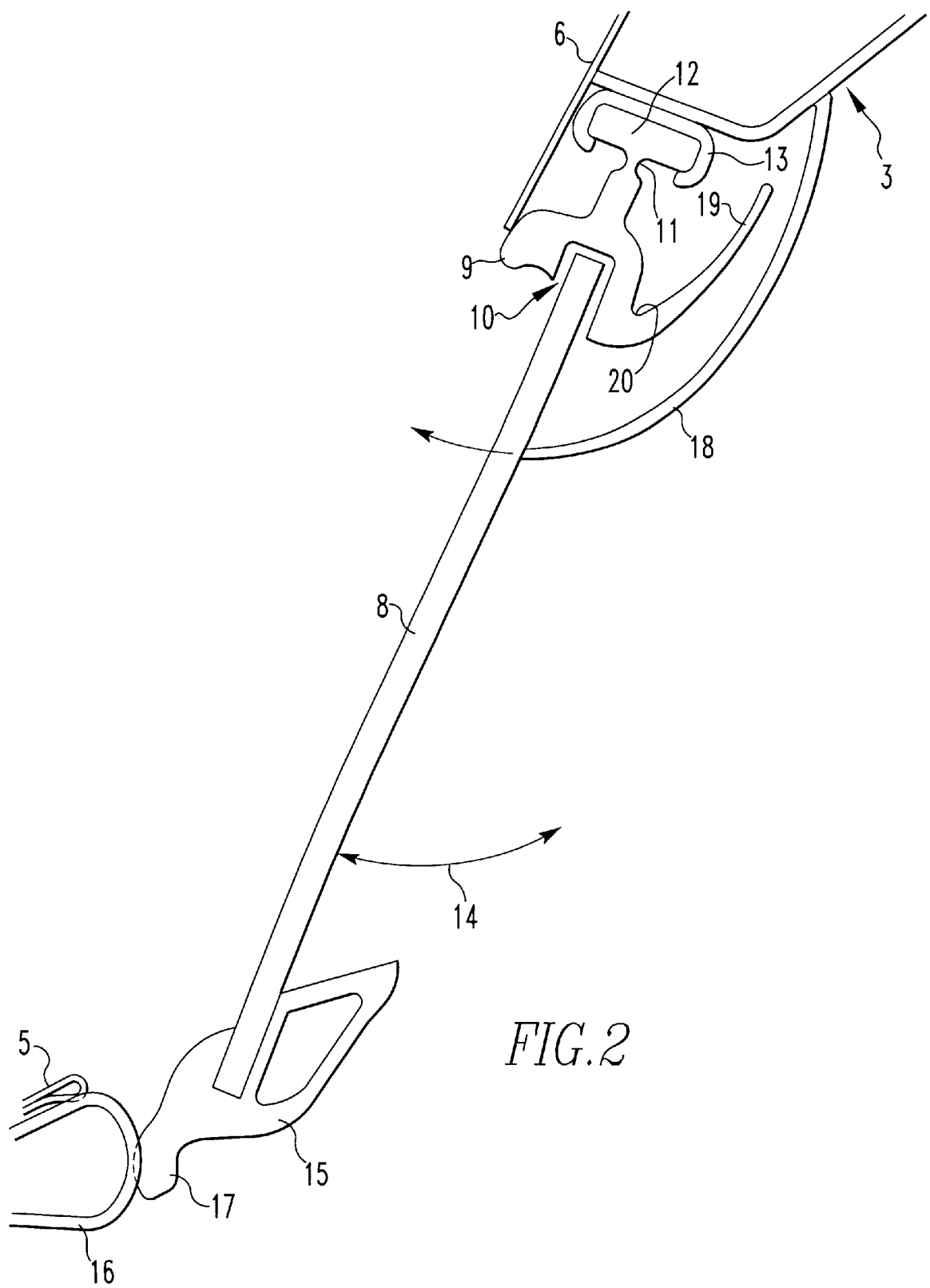
FIG. 2 is a cross-sectional view of the rear triangular side window panel including the surrounding sealing elements taken along line II—II of FIG. 1.

As apparent from the cross-sectional representation of FIG. 2, the upper edge of the rear side window panel 8 adjacent the vehicle top is received in a groove 10 of the sealing element 9. Between the groove 10 for the rear side window panel 8 and a mounting section 12 of the sealing element 9, which is received in a retaining track 13 of the rear top part 3, the sealing element 9 has a reduced-thickness area 11, which forms a hinge or pivot joint about which the rear side window panel 8 can be pivoted with respect to the rear top part 3. The rear side window panel 8 can therefore be pivoted from the closed position as shown in FIG. 2, in which the rear side window panel is fully downwardly pivoted and abuts the vehicle body 5 in a wind- and water tight manner, inwardly into the interior vehicle space and assume an inwardly pivoted open position. Preferably, the pivot angle by which the rear side window panel 8 is to be pivoted in the reduced thickness area 11 of the sealing element 9 is less than 20°, that is about 10°. However, it may also be advantageous to provide for a possible pivot angle of 90° or more so that, in an inwardly pivoted position, the rear side window panel 8 is disposed about in parallel with the top area of the rear top part whereby the required storage space is reduced.

The upper sealing element 9 includes, at the side facing the passenger compartment, an extension 19, which is formed integrally with the sealing element 9 and extends upwardly toward the center of the rear top part 3 and whose inner surface forms a water drainage channel 20 for draining water. The extension 19 at the upper sealing element 9 furthermore forms a cover, which hides the mounting area of the rear side window panel 8 in the seal element 9 from view.

On the side of the rear window panel 8 remote from the rear top part 3, there is provided another lower sealing element 15, which is connected to the rear side window panel 8 adjacent the vehicle body 5. The vehicle body 5 includes a body seal member 16, which cooperates with the lower seal element of the rear window panel 8 when the vehicle top is closed. In the closed position of the vehicle top, a lower sealing portion 17, which is formed integrally with the sealing element 15 abuts the body seal member 16 in a wind- and watertight manner. The contact area between the lower sealing portion 17 of the lower sealing element 15 and the body seal member 16 preferably forms a slide surface along which the lower sealing portion 17 of the lower sealing element 15 can slide when the rear side window panel 8 moves during movement of the top from the closing to the storage position and vice versa.

The rear side window panel 8 is pivotable about the pivot joint 11 as indicated by the arrow 14 and is biased to pivot at about the pivot joint of the seal element outwardly toward the closed, that is the outwardly pivoted position, by a spring element 18, which is supported by the rear top part 3. In this way, a sealing force is generated by which the lower sealing portion 17 of the lower sealing element 15 engages the vehicle body seal member 16.

Figure 3:
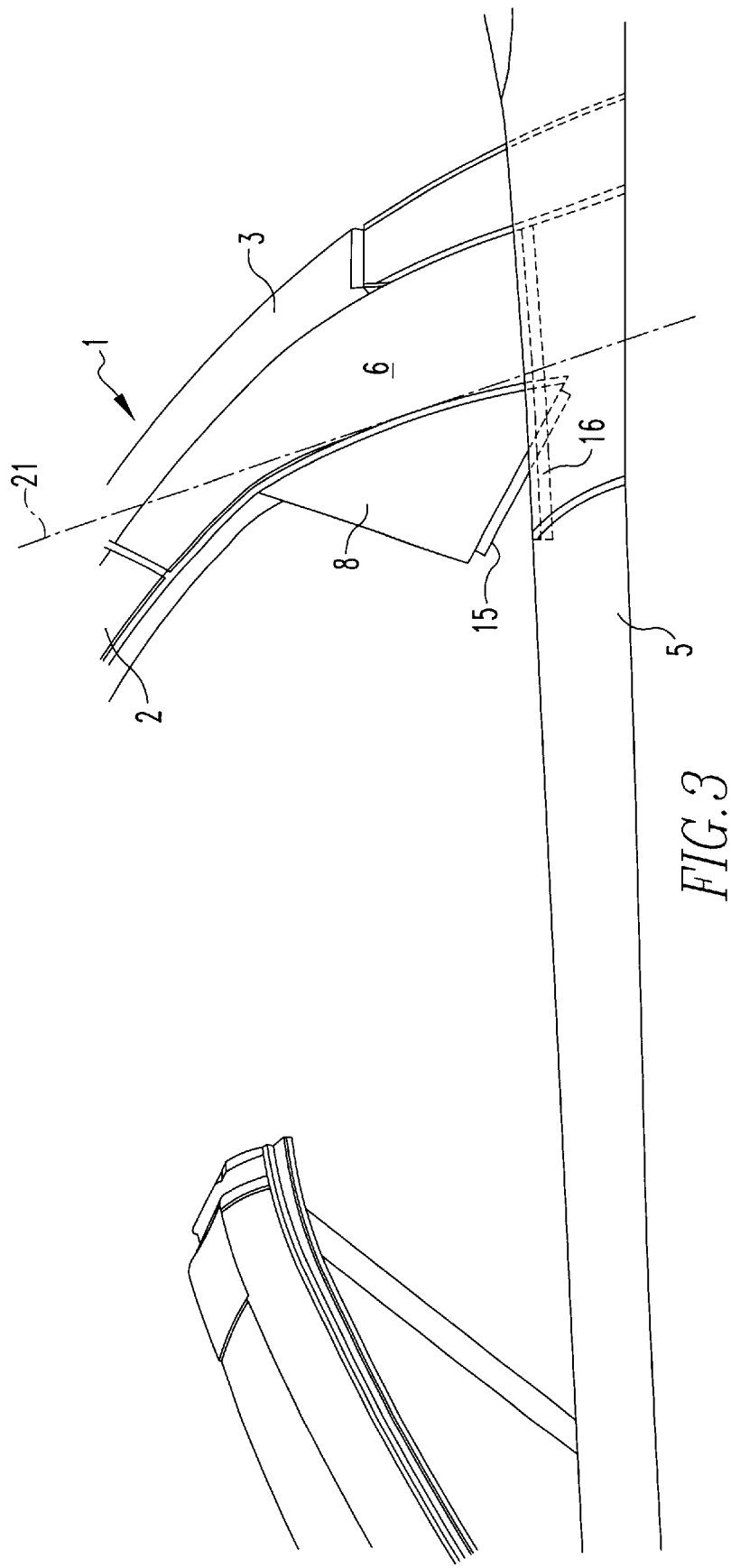
FIG. 3 shows the convertible top in an intermediate position between the closed and the storage positions.

As apparent from FIG. 3, during movement of the vehicle top 1 from a closed position to an open position that is the storage position, the rear side window panel 8, which is mounted to the C-pillar 6 of the rear top part 3, is pivoted inwardly about the pivot axis 21 of the pivot joint between the rear side window panel and the rear top part 3. The pivot axis 21 extends about along the side edges of the rear top part 3.

During the transfer movement, the lower sealing element 15, which is arranged at the lower edge of the rear side window panel 8, slides along the vehicle body seal member 16, which extends on the vehicle body about horizontally over the respective length of the vehicle body adjacent the rear side window panel 8. During the transfer movement, the rear side window panel 8 is biased by the spring element 18 shown in FIG. 2 in an outward direction so that the lower sealing element 15 at the lower edge of the side window panel 8 abuts the body seal member 16 during the whole transfer movement. During movement of the top into the rear storage position, the rear side window panel is pressed increasingly inwardly since, during insertion of the rear top part 3 of the vehicle top 1 into the rear storage compartment, the available space for the slightly sidewardly projecting window panel 8 becomes increasingly smaller.

It may be advantageous to provide at the side window panel, additionally or alternatively to the upper seal element, a separate pivot joint for the pivot movement of the rear side window panel with respect to the vehicle top. Furthermore, the movement of the rear side window panel during transition between the closed and the storage positions may be controlled in both direction of movement of the vehicle top by a kinematic linkage which operates the rear side window panel coupled with the movement of the vehicle top from the closed to the storage position and vice versa.

What is claimed is:

1. A convertible vehicle top which is movable between a closed position in which the top covers an interior space of a vehicle and an open position in which the top is disposed in a storage compartment, said vehicle having a vehicle body with front and rear side windows, with said rear side window being pivotally connected along one edge thereof to said top by a pivot joint, said rear side window having another edge remote from said vehicle top which is spring-biased outwardly into sealing engagement with said vehicle body when said top is in the closed position and said rear side window is pivoted outwardly, said rear side window being pivoted inwardly during movement of said top from said closed position to said open position in which said vehicle is disposed in said storage compartment.

2. A convertible vehicle top according to claim 1, wherein said rear side window comprises a rear side window panel having an edge area adjacent said vehicle top wherein said edge area is received in a seal element attached to said vehicle top.

3. A convertible vehicle top according to claim 2, wherein said seal element is attached to said vehicle top by way of the a pivot joint for said rear side window panel.

4. A convertible vehicle top according to claim 3, wherein said seal element includes a section with reduced cross-section which forms said pivot joint.

5. A convertible vehicle top according to claim 4, wherein, in an area of said rear side window panel adjacent said vehicle body, said rear side window panel is provided with a panel sealing element.

6. A convertible vehicle top according to claim 5, wherein said vehicle body is provided with a body sealing element which is engaged by said panel sealing element when said top is in said closed position.

7. A convertible vehicle top according to claim 6, wherein said body seal element forms a slide surface for said panel sealing element during movement of said vehicle top.

8. A convertible vehicle top according to claim 2, wherein said rear side window panel is a triangular panel which is disposed in an angled transition area between a rear top part of said vehicle top and said vehicle body.

* * * * *